US011321205B2

(12) United States Patent
O'Farrell et al.

(10) Patent No.: US 11,321,205 B2
(45) Date of Patent: May 3, 2022

(54) ENTERPRISE-SCALE TIME SERIES GRAPHITE BACKEND INFRASTRUCTURE

(71) Applicant: International Business Machines Corporation, Armonk, NY (US)

(72) Inventors: William O'Farrell, Markham (CA); Kien Kim Huynh, Thornhill (CA); Paul van Run, Toronto (CA); Bogdan Adamiak, Mississauga (CA)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 16/734,627

(22) Filed: Jan. 6, 2020

(65) Prior Publication Data

US 2021/0208989 A1 Jul. 8, 2021

(51) Int. Cl.
*G06F 11/30* (2006.01)
*G06F 11/34* (2006.01)
*G06F 16/11* (2019.01)

(52) U.S. Cl.
CPC ...... *G06F 11/3006* (2013.01); *G06F 11/3419* (2013.01); *G06F 16/113* (2019.01)

(58) Field of Classification Search
CPC ............ G06F 11/1446; G06F 11/3006; G06F 11/323; G06F 11/3409; G06F 11/3419; G06F 11/3495; G06F 16/113

USPC ........................................................ 702/186
See application file for complete search history.

(56) References Cited

U.S. PATENT DOCUMENTS 10,073,903 B1 9/2018 Arye et al.
10,560,313 B2 * 2/2020 Sglavo ............... G06F 11/1448
2015/0286969 A1 10/2015 Warner

OTHER PUBLICATIONS

Alquiza, "The Architecture of Clustering Graphite," grey-boundary.io, Mar. 2014, 18 pages.

* cited by examiner

*Primary Examiner* — John H Le
(74) *Attorney, Agent, or Firm* — VanLeeuwen & VanLeeuwen; Christopher M. Pignato

(57) ABSTRACT

An approach is provided in which the approach allocates a set of carbon groups to a set of collection rules. Each of the carbon groups includes a primary carbon and a backup carbon. The approach matches a set of time series metrics data to one of the set of collection rules and, in response to matching the set of time series metrics data to one the collection rules, the approach selects the carbon group allocated to the matched collection rule and directs the set of time series metrics data to the selected carbon group. The set of metrics data is processed by both the primary carbon and the backup carbon in the selected carbon group.

17 Claims, 8 Drawing Sheets

700 —

| Rules Table | | |
|---|---|---|
| Priority | Rule # | Condition |
| 1 | 1 | ^servers\.www.*\.workers\.busyWorkers$ |
| 2 | 2 | ^servers\.www.*\.workers\.busy$ |
| 3 | 3 | \.min$ |
| 4 | 4 | ^mydata\.foo\..+ |
| 5 | 5 | ^collectd\. |
| 6 | 6 (default) | .* |

ENTERPRISE-SCALE TIME SERIES GRAPHITE BACKEND INFRASTRUCTURE

BACKGROUND

Graphite is an enterprise-ready monitoring tool that receives numeric time series data pertaining to system components (e.g., servers, applications, networks, etc.) and provides historical or current visualizations of the system components. A user may then use the historical or current visualizations to troubleshoot issues, monitor servers, monitor applications, and identify bottlenecks in system and application configurations.

Graphite includes three main components, which are carbons, relays, and web components. Carbons are backend daemon processes that manage how metrics are being read and written to disk. Carbons also implement efficient cache-based mechanisms to improve performance of metric reads and writes. In addition, carbons listen for time series data and accept the data over a common set of protocols.

Relays are daemon processes that reside in front of the carbons to manage and distribute the time series data across the carbons based on various approaches. Graphite web components provide RESTful (Representational State Transfer) APIs (Application Programming Interfaces) to query raw metrics and facilities to visually render metrics.

BRIEF SUMMARY

According to one embodiment of the present disclosure, an approach is provided in which the approach allocates a set of carbon groups to a set of collection rules. Each of the carbon groups includes a primary carbon and a backup carbon. The approach matches a set of time series metrics data to one of the set of collection rules and, in response to matching the set of time series metrics data to one the collection rules, the approach selects the carbon group allocated to the matched collection rule and directs the set of time series metrics data to the selected carbon group. The set of metrics data is processed by both the primary carbon and the backup carbon in the selected carbon group.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 7 is an exemplary table depicting various collection rules to which a rules evaluator engine compares against incoming metrics data names/paths.

DETAILED DESCRIPTION

Figure 1:
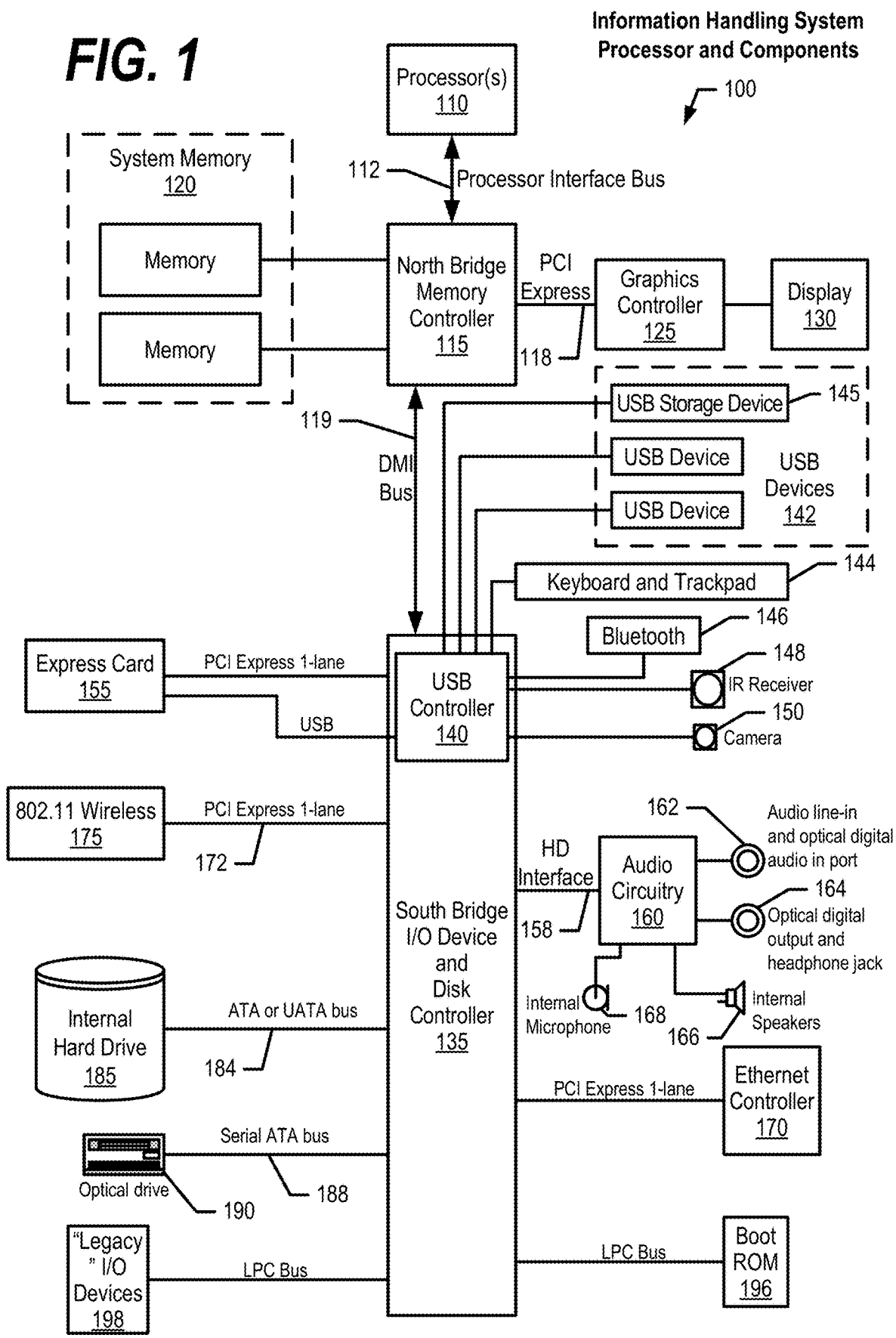
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
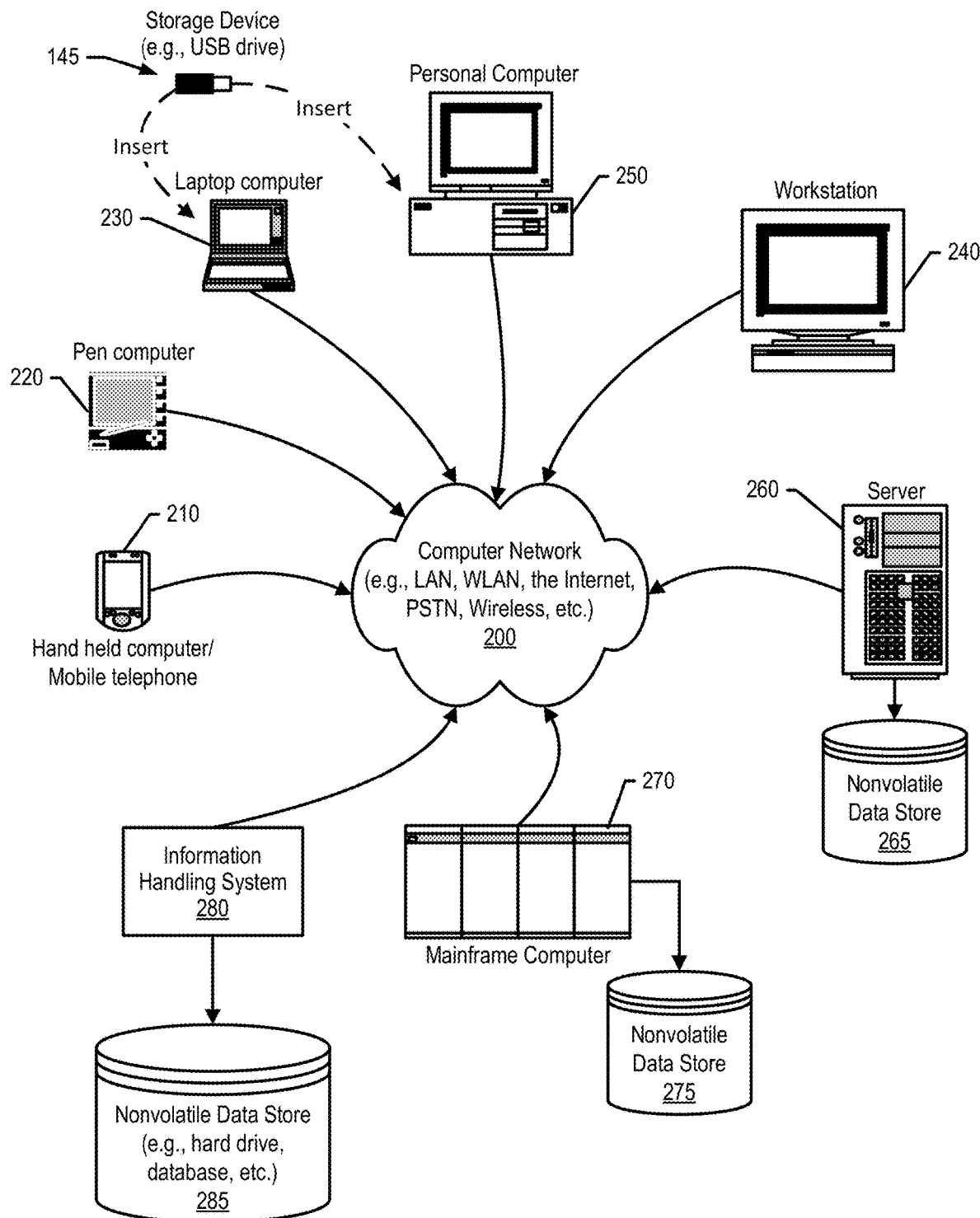
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, Graphite monitoring tools receive numeric time series data (referred to herein as metrics data) and tracks statistics about system components such as servers, applications, networks, etc. Although Graphite is an enterprise-ready open source software, architecting and designing an enterprise-level Graphite backend infrastructure is non-trivial and requires innovative integrations to truly promote the infrastructure's scalability, metric and system high availability, robustness, resiliency, and the ability to handle heavy workloads and vast amount of metrics.

Some prior approaches use a consistent hashing algorithm that guarantee metrics are always forwarded to the same carbons. However, adding or removing carbons due to metrics demand increases or decreases impact the outcome of the consistent hashing algorithm. Unfortunately, as a result, metrics are rehashed and forwarded to new carbons, which leads to (i) unpredictable metrics scatter across carbons and (ii) restricted/capped scalability based on system resource availability.

FIGS. 3 through 8 depict an approach that can be executed on an information handling system that uses a rules-based approach and horizontal scaling to provide an effective enterprise-scale time series graphite backend infrastructure. Among other advantages discussed herein, the approach provides (i) system scalability with flexibility for autoscaling capability; (ii) metric and system high availability with metric replication; (ii) system resiliency and robustness; and (iv) incremental backup capability.

The approach uses a rules evaluator engine that distributes metrics data to specific carbon groups for processing based on a prioritized set of rules. In one embodiment, each carbon group includes a primary carbon, a secondary carbon, and a backup carbon. The primary carbon processes and stores its metrics data in a local storage area. When the primary carbon fails, the secondary carbon takes over to store the metrics data in the local storage area. The backup carbon incrementally backs up the metrics data to a backup storage area, such as a cloud storage area.

In one embodiment, the approach uses a load balancing configuration to spread the metrics data across multiple time series monitoring systems (rules evaluator engines and carbon groups). In this embodiment, when a hardware failure occurs on one of the rules evaluator engines, the approach temporarily removes the failed rules evaluator engine from the load balancer until the issue resolved and distributes incoming metrics data to functioning time series monitoring systems.

As defined herein and discussed above, a carbon is a backend daemon process that manages how metrics are read from and written to disk. Carbons listen for time series data, accept the data over a common set of protocols, and implement efficient cache-based mechanisms to improve metric read/write performance.

Figure 3:
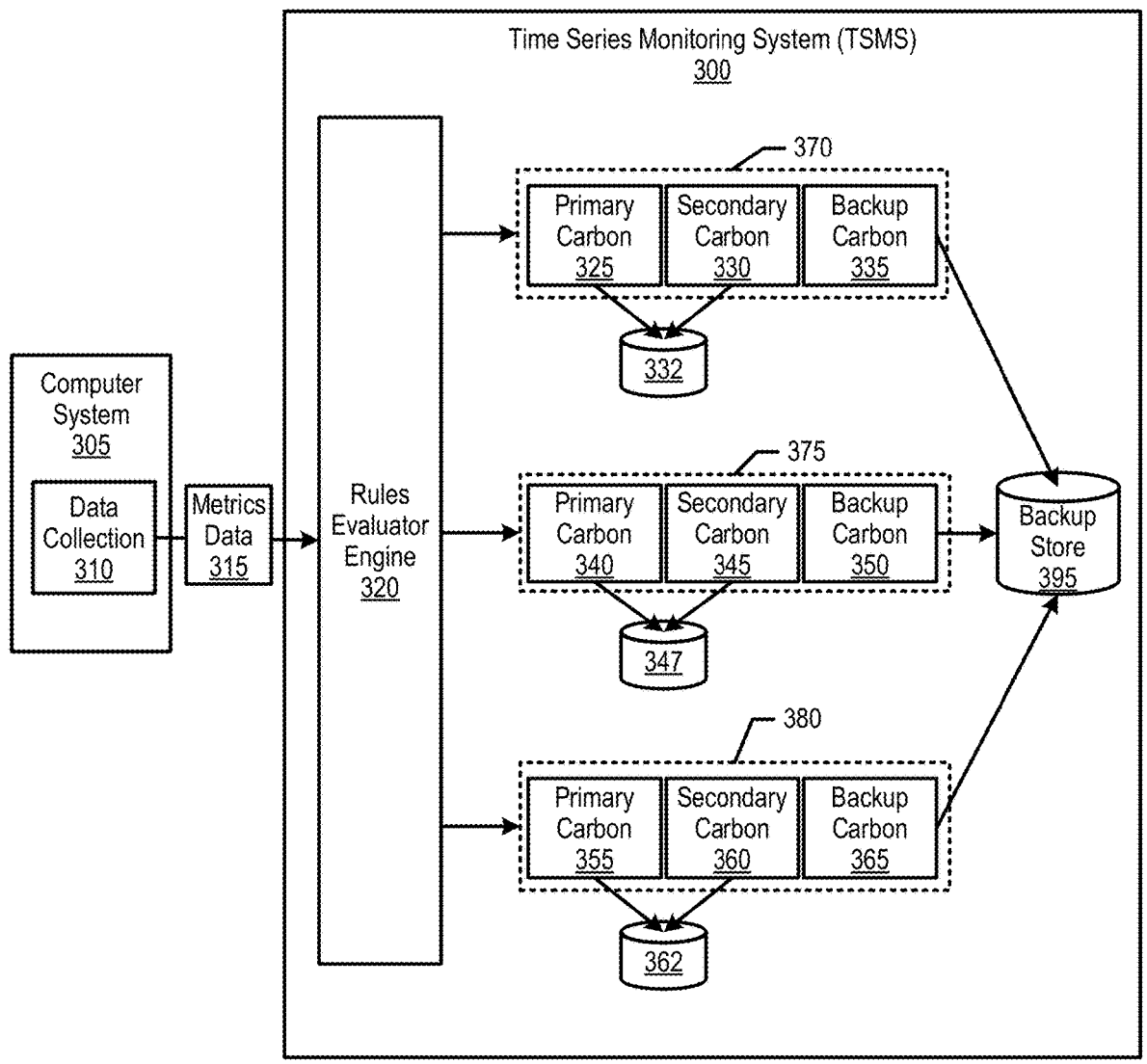
FIG. 3 is a high-level diagram depicting a time series monitoring system that uses a rules-based approach to promote horizontal scaling and metric distribution.

FIG. 3 is a high-level diagram depicting a time series monitoring system that uses a rules-based approach to promote horizontal scaling and metric distribution. FIG. 3 shows time series monitoring system 300 that receives metrics data 315 from computer system 305's data collection service 310. Data collection service 310, in one embodiment, is a service that translates plain text logging data (e.g., in the form <metric path> <metric value> <metric timestamp>) into coded metrics data 315. Metrics data 315 is time series data that includes (i) a metric name/path, (ii) a metric value, and (iii) a timestamp of the metric.

Figure 4:
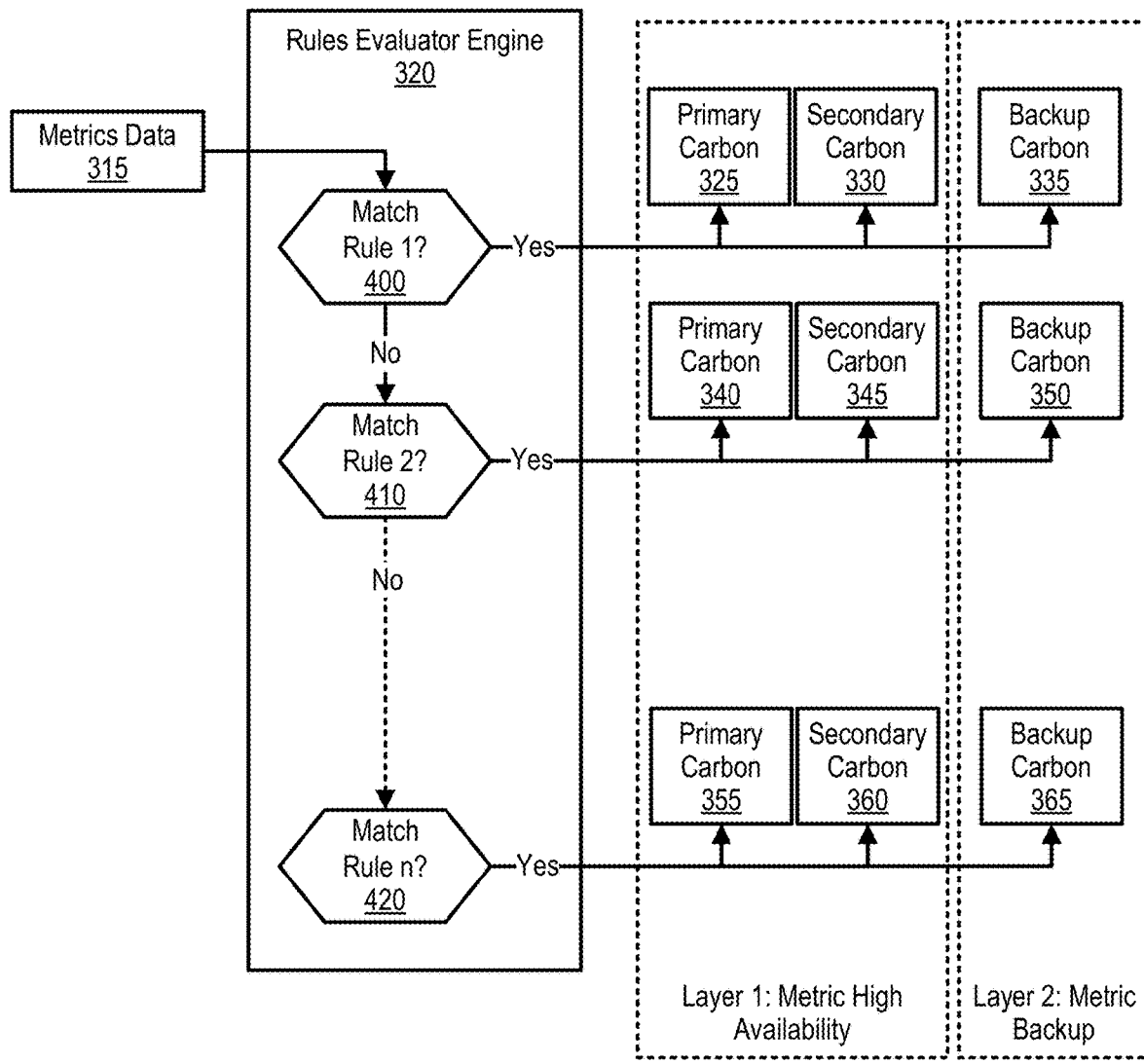
FIG. 4 is an exemplary diagram depicting a rules evaluator engine evaluating metrics data against various rules in sequential and prioritized order.

Rules evaluator engine 320 uses a set of rules to direct metrics data 315 to the appropriate carbon groups (see FIGS. 4, 7, and corresponding text for further details). In one embodiment, the rules include a set of static regular expression-based rules that appear in sequential order based on priority for which each metric name/path in metrics data 315 is evaluated (e.g., reverse hierarchical order, see FIG. 7 and corresponding text for further details).

FIG. 3 shows three carbon groups 370, 375, and 380 that support three different rules. Each group includes a primary carbon, a secondary carbon, and a backup carbon. Group 370 includes primary carbon 325, secondary carbon 330, and backup carbon 335. Group 375 includes primary carbon 340, secondary carbon 345, and backup carbon 350. Group 380 includes primary carbon 355, secondary carbon 360, and backup carbon 365.

In one embodiment, each primary/secondary carbon pair uses local data stores for metric persistence. Primary carbon 325 and secondary carbon 330 write data to local data store 332. Primary carbon 340 and secondary carbon 345 write data to local data store 347. And, primary carbon 355 and secondary carbon 360 write data to local data store 362. In another embodiment, the primary carbons and secondary carbons store their metrics data across multiple disks and servers.

Due to the fact that carbons are daemon processes that manage metric writes and reads, they are disk I/O intensive. An enterprise scale infrastructure processes and stores approximately 10 or more terabytes worth of data, making daily filesystem backup an expensive process. During a backup, a vast volume of metrics data is read from and written to backup storage, which consumes a considerable amount of CPU/disk IO/memory/network resources. A sudden surge in CPU/Disk IO/Memory/network significantly impacts carbon performance. As such, it is not feasible to enable a daily backup process using the primary carbons/secondary carbons to transfer terabytes of data to storage.

To resolve the above backup issue, each carbon group includes a backup carbon (335, 350, 365) that performs an incremental self-backup process that backs up (aggregates) the metrics data to backup store 395 (e.g., cloud storage). In one embodiment, time series monitoring system 300 modifies rules evaluator engine 320 to not only send metrics to designated primary and secondary carbon pairs, but to also send the metrics to their corresponding backup carbon. In one embodiment, the difference between a carbon group's backup carbon and its primary/secondary carbons is based on where a particular carbon persists its metrics. The primary carbons and secondary carbons persist their metrics into corresponding local (high performance) hard disks 332, 347, and 362, and the backup carbons incrementally forward their metrics to a file storage for backup with zero demand on metric reads (backup store 395).

In one embodiment, time series monitoring system 300 introduces another group of carbons that forward metrics to testing systems for metric testing purposes.

FIG. 4 is an exemplary diagram depicting rules evaluator engine 320 evaluating metrics data 315 against various rules in sequential order. Rules evaluator engine 320 directs metrics data 315 to primary/secondary carbons (Layer 1 metric high availability) and corresponding backup carbons (Layer 2 metric backup) when metrics data 315 matches one of the rules in a rules table (see FIG. 7 and corresponding text for further details).

When metrics data 315 matches rule 1 400, such as "metric name/path=^servers\.www.*\.workers\.busyWorkers$," rules evaluator engine 320 passes the metrics data to primary carbon 325 if operational or secondary carbon 330 if primary carbon 325 is not operational. In one embodiment, rules evaluator engine 320 passes the metrics data 315 to both primary carbon 325 and secondary carbon 330. In addition, backup carbon 335 receives the matching metrics data to back up the data.

When metrics data 315 does not match rule 1 400, rules evaluator engine 325 determines if metrics data 325 matches rule 2 410. If so, rules evaluator engine 320 passes the metrics data to primary carbon 340 if operational or secondary carbon 345 if primary carbon 340 is not operational. In addition, backup carbon 350 receives the matching metrics data to back up the data.

When metrics data 315 does not match rule 2 410, rules evaluator engine 325 determines if metrics data 325 matches rule n 420. If so, rules evaluator engine 320 passes the metrics data to primary carbon 355 if operational or secondary carbon 360 if primary carbon 355 is not operational. In addition, backup carbon 365 receives the matching metrics data to back up the data.

In one embodiment, when a set of metrics discontinues, the corresponding rule that matches the set of metric pattern is eliminated from the rules table. As such, time series monitoring system 300 decommissions or deallocates the corresponding carbon group. In another embodiment, time series monitoring system 300 adds more carbon groups as more rules are added. As such, time series monitoring system 300 provides dynamic flexibility to horizontally scale up or down based on increasing or decreasing metric data demand.

Figure 5:
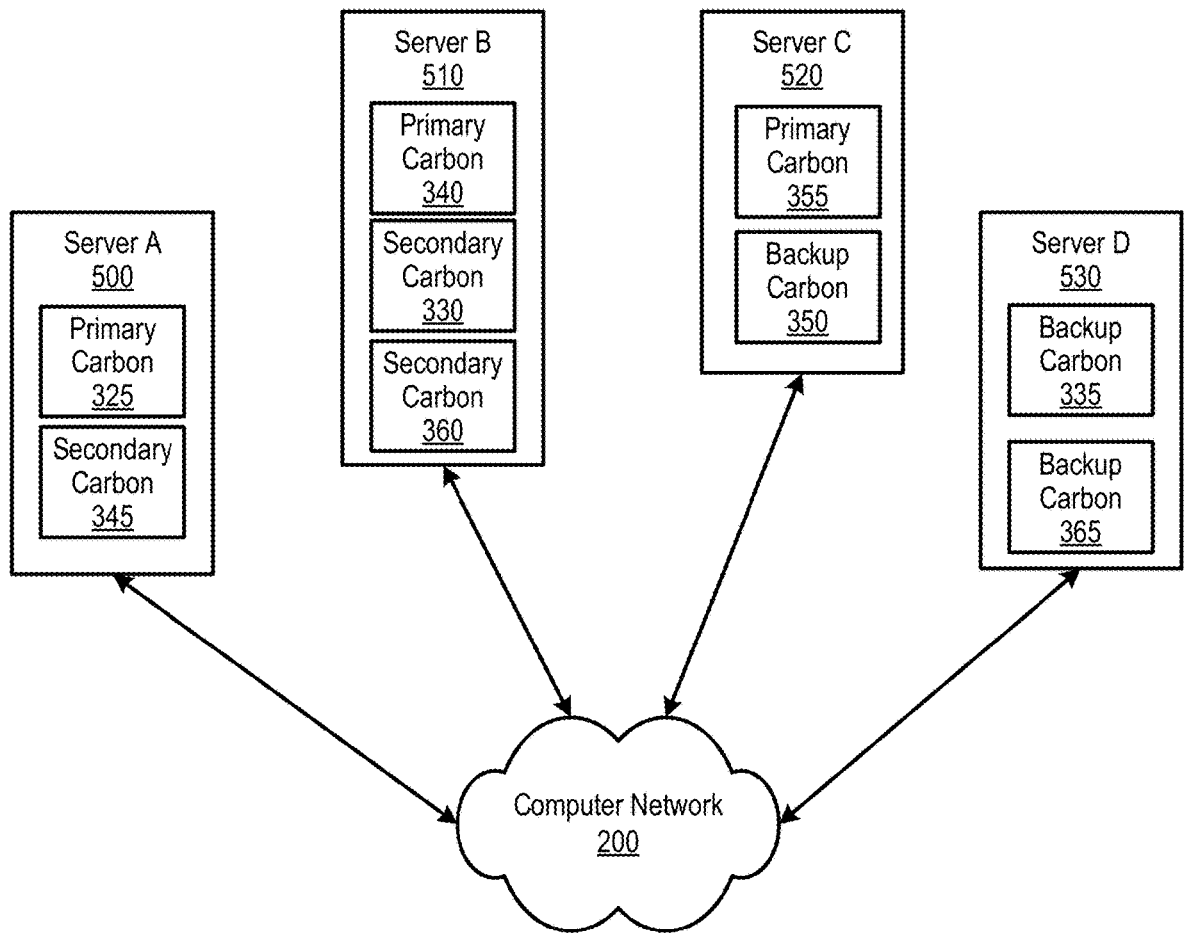
FIG. 5 is an exemplary diagram depicting carbons within a carbon group distributed across multiple servers.

FIG. 5 is an exemplary diagram depicting carbons within a carbon group distributed across multiple servers. From carbon group 370, primary carbon 325 resides on server A 500, secondary carbon 330 resides on server B 510, and backup carbon 335 resides on sever D 530. Likewise, from carbon group 375, primary carbon 340 resides on server B 510, secondary carbon 345 resides on server A 500, and backup carbon 350 resides on sever C 520. And, from carbon group 380, primary carbon 355 resides on sever C 520, secondary carbon 360 resides on server B 510, and backup carbon 365 resides on server D 530. As such, if any one of the servers has a failure and causes a primary carbon to fail, its corresponding secondary carbon gains control to process incoming metrics data 315.

Figure 6:
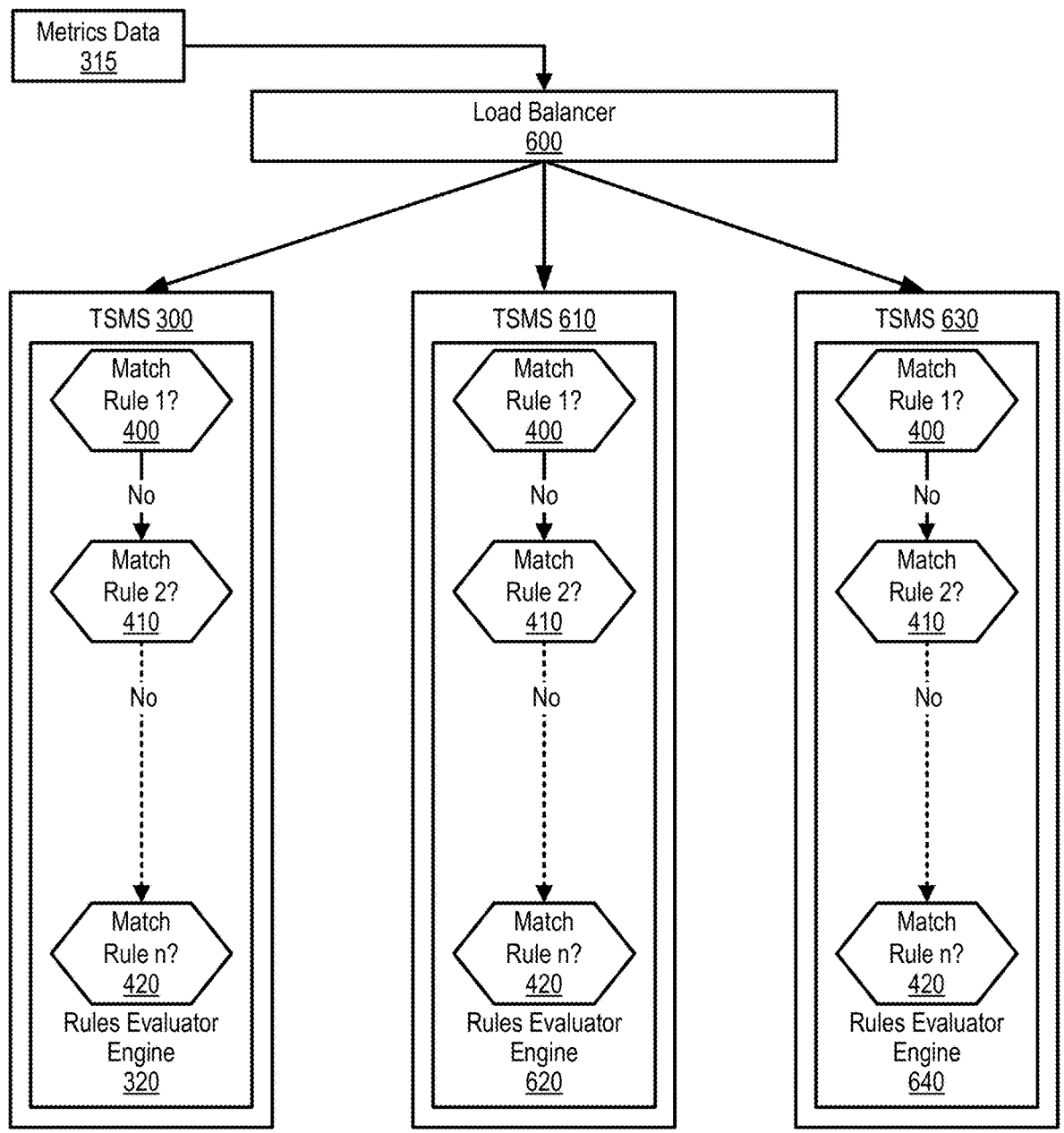
FIG. 6 is an exemplary diagram depicting a load balancer configuration that distributes incoming metrics data across multiple time series monitoring systems.

FIG. 6 is an exemplary diagram depicting load balancer 600 distributing incoming metrics data across multiple time series monitoring systems 300, 610, and 630. To reduce the load on rules evaluator engine 320, FIG. 6 shows an approach of using load balancer 600 (e.g., a proxy) to distribute metrics data 315 across several time series monitoring systems (TSMS) 300, 610, and 630. TSMS 300, 610, and 630 include rules evaluator engines 320, 620, and 640, respectively, that each have the same rule matching decisions 400, 410, and 420. In one embodiment, load balancer 600 uses DNS (Domain Name System) to provide high availability at the load balancer level.

FIG. 7 is an exemplary table depicting various collection rules to which rules evaluator engine 320 compares against incoming metrics data 315 names/paths. Rules table 700 includes six collection rules (column 720) organized in priority (column 710) and their corresponding metric name/path in column 730. In one embodiment, the rules are prioritized in reverse hierarchical order such that child collection rules are prioritized higher than parent collection rules. As can be seen, the first collection rule that rules evaluator engine 320 compares against metrics data 315 is whether metrics data 315 has a "^servers\.www.*\.workers\.busyWorkers$" metrics name/path. If so, referring back to FIG. 4, rules evaluator engine 320 sends metrics data 315 to primary carbon 325, secondary carbon 330, and backup carbon 335. Rules table 700 also shows that rule 6 is a default rule when metrics data 315 does not match any of rules 1 through 5.

In one embodiment, an operator or user generates the rules as part of a configuration step and the rules are prioritized according to policies which govern the collection process. FIG. 7 shows that the user has chosen to collect "busyWorkers" (rule 1) in a separate carbon from other busy elements (e.g., "busyMonitors" and "busyCollectors"). In one embodiment, dynamically assigning/removing a carbon from a rule requires a step to move the collected data from live storage to archival storage, along with moving any existing backups (see FIG. 8 and corresponding text for further details).

Figure 8:
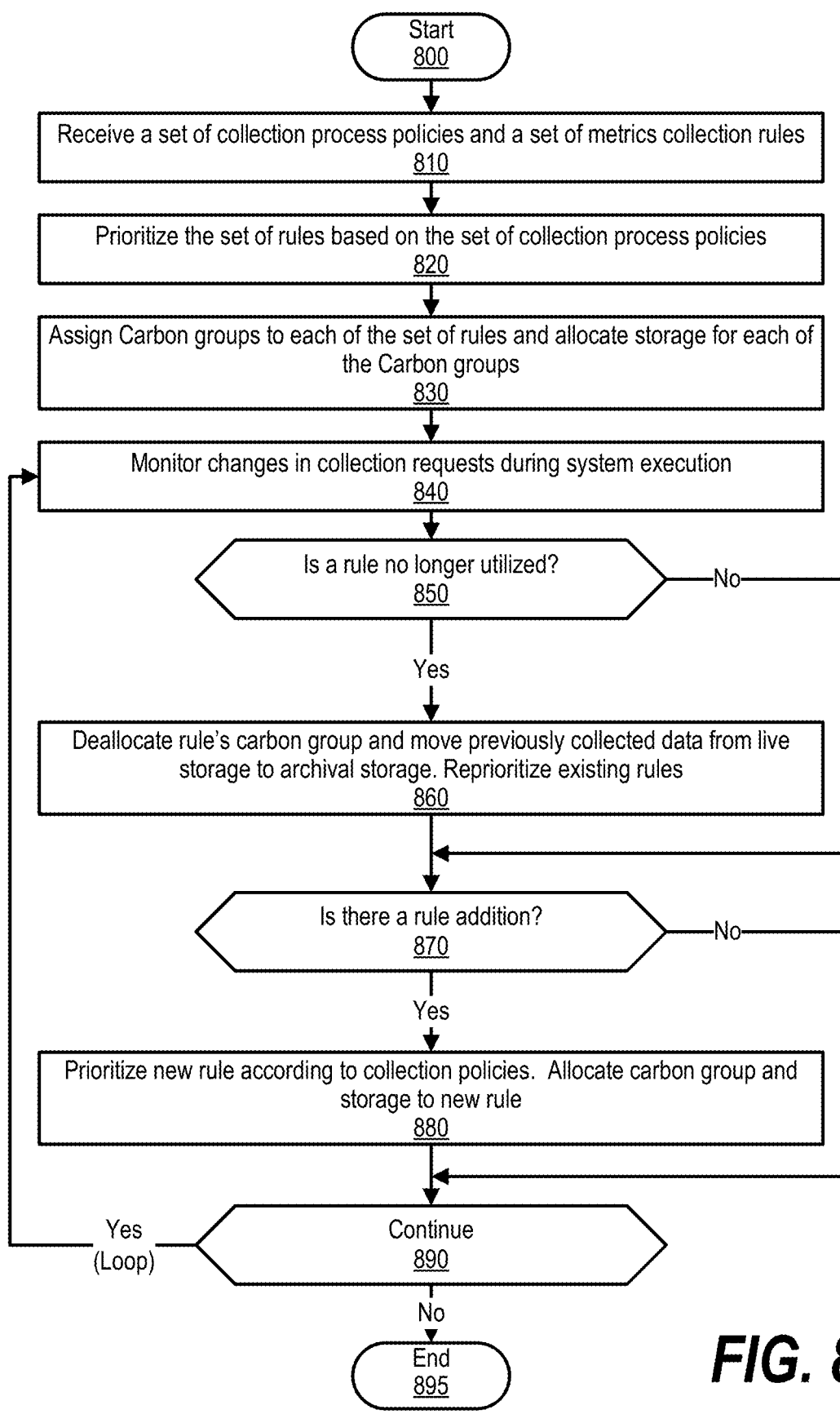
FIG. 8 is a flowchart showing steps taken to configure a set of carbon groups to collect metrics data and dynamically adjust the carbon groups according to changes in metrics collections rules.

FIG. 8 is a flowchart showing steps taken to configure a set of carbon groups to collect metrics data and dynamically adjust allocation of the carbon groups based on changes in metrics collections rules. FIG. 8 processing commences at 800 whereupon, at step 810, the process receives a set of collection process policies and a set of metrics collection rules.

At step 820, the process prioritizes the set of rules based on the set of collection process policies, such as the policy "Put server events first before all other events. Within servers, put 'www' server events before microservice events. Immediately after server events, put database access events." At step 830, the process assigns a carbon group (primary carbon, secondary carbon, and backup carbon) to each of the set of rules and allocates storage for each of the carbon groups in local/cloud storage areas.

At step 840, the process monitors changes in metrics while metrics data 315 is distributed across the carbon groups. In one embodiment, the process detects when a certain type of metrics is no longer being collected or when a user adds/removes metrics collection rules. The process determines as to whether a rule is no longer utilized, such as from a user removing the rule or detecting that metrics are no longer being collected for the particular rule (decision 850). If a rule is no longer utilized, then decision 850 branches to the 'yes' branch whereupon, at step 860, the process deallocates the rule's carbon group (primary carbon, secondary carbon, and backup carbon), moves previously collected data from live local storage to archival storage, and reprioritizes the existing rules in rules table 700. On the other hand, if there no rules that are no longer utilized, then decision 850 branches to the 'no' branch bypassing step 860.

The process determines as to whether there is there a rule addition (decision 870). If is there a rule addition (e.g., a user adds a rule), then decision 870 branches to the 'yes' branch whereupon, at step 880, the process prioritizes the new rule according to collection policies discussed above, allocates a carbon group to the new rule, and allocates storage to the new carbon group. On the other hand, if there is not a rule addition, then decision 870 branches to the 'no' branch bypassing step 880.

The process determines as to whether to continue (decision 890). If the process should continue, then decision 890 branches to the 'yes' branch which loops back to continue to monitor system execution and changes to the metrics collection preferences. This looping continues until the process should terminate, at which point decision 890 branches to the 'no' branch exiting the loop. FIG. 8 processing thereafter ends at 895.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
allocating one of a plurality of carbon groups to each of a plurality of collection rules, wherein each of the plurality of carbon groups comprises one of a plurality of primary carbons and one of a plurality of backup carbons;
prioritizing the plurality of collection rules, the prioritizing further comprising:
identifying a first one of the plurality of collection rules corresponding to a first metric path;
identifying a second one of the plurality of collection rules corresponding to a second metric path; and
prioritizing the second collection rule higher than the first collection rule in response to determining that the second metric path is a child path of the first metric path;
evaluating a set of time series metrics data against the plurality of collection rules based on the prioritizing;
matching the set of time series metrics data to one of the plurality of collection rules based on the evaluating; and
in response to the matching, directing the set of time series metrics data to a selected one of the plurality of carbon groups allocated to the matched collection rule, wherein the set of time series metrics data is processed by both a selected one of the plurality of primary carbons and a selected one of the plurality of backup carbons included in the selected carbon group.

2. The method of claim 1 further comprising:
persisting, by the selected primary carbon, the set of time series metrics data to a local storage area; and
persisting, by the selected backup carbon, the time series metrics data to a cloud storage area.

3. The method of claim 2 further comprising:
allocating one of a plurality of secondary carbons to each of the plurality of carbon groups;
in response to determining that the selected primary carbon in the selected carbon group fails, directing the set of time series metrics data to a selected one of the plurality of secondary carbons allocated to the selected carbon group; and
persisting, by the selected secondary carbon, the set of time series metrics data to the local storage area.

4. The method of claim 1 further comprising:
in response to determining that the matched collection rule is no longer utilized:
deallocating the selected primary carbon and the selected backup carbon from the matched collection rule;
archiving the set of time series metrics data; and
reprioritizing the plurality of collection rules less the matched collection rule.

5. The method of claim 1 wherein the method is performed by a time series monitoring system, the method further comprising:
configuring a load balancer to distribute a plurality of sets of time series metrics data comprising the set of time series metrics data across a plurality of time series monitoring systems comprising the time series monitoring system, wherein each of the plurality of time series monitoring systems utilizes the plurality of collection rules to evaluate the plurality of sets of time series metrics data; and
distributing, by the load balancer, the plurality of sets of time series metrics data to the plurality of time series monitoring systems based on an availability of each of the plurality of time series monitoring systems.

6. The method of claim 1 further comprising:
aggregating, by each of the plurality of backup carbons, a plurality of sets of time series metrics data comprising the set of time series metrics data into a cloud storage area.

7. An information handling system comprising:
one or more processors;
a memory coupled to at least one of the processors;
a set of computer program instructions stored in the memory and executed by at least one of the processors in order to perform actions of:
allocating one of a plurality of carbon groups to each of a plurality of collection rules, wherein each of the plurality of carbon groups comprises one of a plurality of primary carbons and one of a plurality of backup carbons;
prioritizing the plurality of collection rules, the prioritizing further comprising:
identifying a first one of the plurality of collection rules corresponding to a first metric path;
identifying a second one of the plurality of collection rules corresponding to a second metric path; and
prioritizing the second collection rule higher than the first collection rule in response to determining that the second metric path is a child path of the first metric path;
evaluating a set of time series metrics data against the plurality of collection rules based on the prioritizing;
matching the set of time series metrics data to one of the plurality of collection rules based on the evaluating; and
in response to the matching, directing the set of time series metrics data to a selected one of the plurality of carbon groups allocated to the matched collection rule, wherein the set of time series metrics data is processed by both a selected one of the plurality of primary carbons and a selected one of the plurality of backup carbons included in the selected carbon group.

8. The information handling system of claim 7 wherein the processors perform additional actions comprising:
persisting, by the selected primary carbon, the set of time series metrics data to a local storage area; and
persisting, by the selected backup carbon, the time series metrics data to a cloud storage area.

9. The information handling system of claim 8 wherein the processors perform additional actions comprising:
allocating one of a plurality of secondary carbons to each of the plurality of carbon groups;
in response to determining that the selected primary carbon in the selected carbon group fails, directing the set of time series metrics data to a selected one of the plurality of secondary carbons allocated to the selected carbon group; and
persisting, by the selected secondary carbon, the set of time series metrics data to the local storage area.

10. The information handling system of claim 7 wherein the processors perform additional actions comprising:
in response to determining that the matched collection rule is no longer utilized:
deallocating the selected primary carbon and the selected backup carbon from the matched collection rule;
archiving the set of time series metrics data; and
reprioritizing the plurality of collection rules less the matched collection rule.

11. The information handling system of claim 7 wherein the processors perform additional actions comprising:
- configuring a load balancer to distribute a plurality of sets of time series metrics data comprising the set of time series metrics data across a plurality of time series monitoring systems comprising the time series monitoring system, wherein each of the plurality of time series monitoring systems utilizes the plurality of collection rules to evaluate the plurality of sets of time series metrics data; and
- distributing, by the load balancer, the plurality of sets of time series metrics data to the plurality of time series monitoring systems based on an availability of each of the plurality of time series monitoring systems.

12. The information handling system of claim 7 wherein the processors perform additional actions comprising:
- aggregating, by each of the plurality of backup carbons, a plurality of sets of time series metrics data comprising the set of time series metrics data into a cloud storage area.

13. A computer program product stored in a computer readable storage medium, comprising computer program code that, when executed by an information handling system, causes the information handling system to perform actions comprising:
- allocating one of a plurality of carbon groups to each of a plurality of collection rules, wherein each of the plurality of carbon groups comprises one of a plurality of primary carbons and one of a plurality of backup carbons;
- prioritizing the plurality of collection rules, the prioritizing further comprising:
  - identifying a first one of the plurality of collection rules corresponding to a first metric path;
  - identifying a second one of the plurality of collection rules corresponding to a second metric path; and
  - prioritizing the second collection rule higher than the first collection rule in response to determining that the second metric path is a child path of the first metric path;
- evaluating a set of time series metrics data against the plurality of collection rules based on the prioritizing;
- matching the set of time series metrics data to one of the plurality of collection rules based on the evaluating; and
- in response to the matching, directing the set of time series metrics data to a selected one of the plurality of carbon groups allocated to the matched collection rule, wherein the set of time series metrics data is processed by both a selected one of the plurality of primary carbons and a selected one of the plurality of backup carbons included in the selected carbon group.

14. The computer program product of claim 13 wherein the information handling system performs further actions comprising:
- persisting, by the selected primary carbon, the set of time series metrics data to a local storage area; and
- persisting, by the selected backup carbon, the time series metrics data to a cloud storage area.

15. The computer program product of claim 14 wherein the information handling system performs further actions comprising:
- allocating one of a plurality of secondary carbons to each of the plurality of carbon groups;
- in response to determining that the selected primary carbon in the selected carbon group fails, directing the set of time series metrics data to a selected one of the plurality of secondary carbons allocated to the selected carbon group; and
- persisting, by the selected secondary carbon, the set of time series metrics data to the local storage area.

16. The computer program product of claim 13 wherein the information handling system performs further actions comprising:
- in response to determining that the matched collection rule is no longer utilized:
  - deallocating the selected primary carbon and the selected backup carbon from the matched collection rule;
  - archiving the set of time series metrics data; and
  - reprioritizing the plurality of collection rules less the matched collection rule.

17. The computer program product of claim 13 wherein the information handling system performs further actions comprising:
- configuring a load balancer to distribute a plurality of sets of time series metrics data comprising the set of time series metrics data across a plurality of time series monitoring systems comprising the time series monitoring system, wherein each of the plurality of time series monitoring systems utilizes the plurality of collection rules to evaluate the plurality of sets of time series metrics data; and
- distributing, by the load balancer, the plurality of sets of time series metrics data to the plurality of time series monitoring systems based on an availability of each of the plurality of time series monitoring systems.

* * * * *